United States Patent
Cheng et al.

(10) Patent No.: US 7,151,244 B2
(45) Date of Patent: Dec. 19, 2006

(54) METHOD AND APPARATUS FOR CALIBRATION OF NEAR-FIELD SCANNING OPTICAL MICROSCOPE TIPS FOR LASER MACHINING

(75) Inventors: Chen-Hsiung Cheng, Westford, MA (US); Ming Li, Chelmsford, MA (US)

(73) Assignee: Matsushita Electric Industrial Co., Ltd, Osaka (JP)

( * ) Notice: Subject to any disclaimer, the term of this patent is extended or adjusted under 35 U.S.C. 154(b) by 202 days.

(21) Appl. No.: 10/932,617

(22) Filed: Sep. 2, 2004

(65) Prior Publication Data

US 2006/0043257 A1   Mar. 2, 2006

(51) Int. Cl.
*G02B 7/04* (2006.01)
(52) U.S. Cl. .................. 250/201.3; 250/559.1
(58) Field of Classification Search .......... 250/201.3, 250/559.1, 205, 306
See application file for complete search history.

(56) References Cited

U.S. PATENT DOCUMENTS 6,703,614 B1 * 3/2004 Stifter et al. ............... 250/306
2005/0218315 A1 * 10/2005 Li et al. ..................... 250/234

* cited by examiner

*Primary Examiner*—Que T. Le
(74) *Attorney, Agent, or Firm*—RatnerPrestia (57) ABSTRACT

A system for measuring radiation at a peak wavelength that is radiated from a probe tip of a near-field scanning optical microscope (NSOM) probe used for laser machining, including: a laser source; the NSOM probe; a coupling substrate that is substantially transmissive to the peak wavelength; an NSOM mount to controllably hold the probe and the coupling substrate; an NSOM probe monitor coupled to the mount; an NSOM controller; and a photodetector optically coupled to the substrate. Light is coupled into the probe. The mount includes a Z motion stage. The probe monitor determines the distance between the probe tip and the coupling substrate. The controller is coupled to the probe monitor and the motion stage. It controls the distance between the probe tip and the coupling substrate such that radiation is coupled from the probe tip into the coupling substrate. The photodetector measures the power of this radiation.

53 Claims, 6 Drawing Sheets

FIG. 6C

METHOD AND APPARATUS FOR CALIBRATION OF NEAR-FIELD SCANNING OPTICAL MICROSCOPE TIPS FOR LASER MACHINING

FIELD OF THE INVENTION

The present invention concerns an apparatus and method for calibrating the probe tips of a near-field scanning optical microscope (NSOM). This method may also provide for the improved manufacture, mass customization, or repair of electronic, optical, and mechanical microstructures.

BACKGROUND OF THE INVENTION

As products get smaller and smaller, there is increased demand for micro-electrical-mechanical systems (MEMS), micro-optical devices and photonic crystals. With this demand, there is an associated increased interest in micro- and nano-machining. Numerous applications exist for MEMS. As a breakthrough technology, allowing unparalleled synergy between previously unrelated fields such as biology and microelectronics, new MEMS applications are emerging at a rapid pace, expanding beyond those currently identified or known. Additional applications in quantum electric devices, micro-optical devices and photonic crystals are also emerging.

Here are a few applications of current interest:

Quantum Electrical Devices

Interest in ideas such as quantum computing have led to the development of devices requiring increasing smaller dimensions, such as cellular automata and coupled quantum dot technologies. Resonant tunneling devices such as resonant tunneling diodes, which may utilize quantum effects of transmission electrons to increase the efficiency of microwave circuits, require particularly fine features.

Micro-Optics

The application of micro-machining techniques to optics has lead to numerous advances in optical fabrication such as gray scale technology. Gray scale technology allows for the creation of a wide variety of shapes allowing for the best optical performance achievable. Traditional binary optics rely on a "stair step" shaped approximation of the ideal surface shape. Gray scale can actually create that ideal shape. Curves, ramps, torroids, or any other shape is possible. Multi-function optics, microlens arrays, diffusers, beam splitters, and laser diode correctors may all benefit from the use of gray scale technology. These optical devices as well as others, including fine pitch gratings for shorter and shorter wavelength light, benefit from increased precision available using micro-machining. Optical MEMS devices including beam shapers, continuous membrane deformable mirrors, moving mirrors for tunable lasers, and scanning two axis tilt mirrors have also emerged due to progress in micro-machining technology.

Photonic Crystals

Photonic crystals represent an artificial form of optical material that may be used to create optical devices with unique properties. Photonic crystals have many optical properties that are analogous to the electrical properties of semiconductor crystals and, thus, may also allow the development of optical circuitry similar to present electrical semiconductor circuitry. The feature sizes used to form photonic crystals and the precise alignment requirements of these features complicate manufacture of these materials. Improved alignment techniques and reduced minimum feature size capabilities for micro-machining systems may lead to further developments in this area.

Biotechnology

MEMS technology has enabling new discoveries in science and engineering such as: polymerase chain reaction (PCR) microsystems for DNA amplification and identification; micro-machined scanning tunneling microscope (STM) probe tips; biochips for detection of hazardous chemical and biological agents; and Microsystems for high-throughput drug screening and selection.

Communications

In addition to advances that may result from the use of resonant tunneling devices, high frequency circuits may benefit considerably from the advent of RF-MEMS technology. Electrical components such as inductors and tunable capacitors made using MEMS technology may perform significantly better than their present integrated circuit counterparts. With the integration of such components, the performance of communication circuits may be improved, while the total circuit area, power consumption and cost may be reduced. In addition, a MEMS mechanical switch, as developed by several research groups, may be a key component with huge potential in various microwave circuits. The demonstrated samples of MEMS mechanical switches have quality factors much higher than anything previously available. Reliability, precise tuning, and packaging of RF-MEMS components are to be critical issues that need to be solved before they receive wider acceptance by the market.

Advances in micro-optics and the introduction of new optical devices using photonic crystals may also benefit communications technology.

Accelerometers

MEMS accelerometers are quickly replacing conventional accelerometers for crash air-bag deployment systems in automobiles. The conventional approach uses several bulky accelerometers made of discrete components mounted in the front of the car with separate electronics near the air-bag. MEMS technology has made it possible to integrate the accelerometer and electronics onto a single silicon chip at a cost of $\frac{1}{5}$ to $\frac{1}{10}$ of the cost of the conventional approach. These MEMS accelerometers are much smaller, more functional, lighter, and more reliable as well, compared to the conventional macro-scale accelerometer elements.

Micro-Circuitry

Reducing the size of electronic circuits is another area in which MEMS technology may affect many fields. As the density of components and connections increases in these microcircuits, the processing tolerances decrease. One challenge in producing micro-circuitry is preventing shorts between components and nano-wires which are located ever closer together. Yields may be significantly increased by micromachining methods with the capability to repair these defects.

Laser machining of surfaces using the near-field mode radiation of a near-field scanning optical microscope (NSOM), sometimes known as a scanning near-field optical microscope, has been proposed as a means of laser machining submicron features. One potential method for micromachining surfaces in this way is disclosed in Japanese Patent Application 2000-51975, LASER MACHINING APPARATUS AND ITS METHOD AND AN OPTICAL ELEMENT MACHINED BY USING SAME, to H. Owari, et al. Owari, et al. disclose using light from a short-wavelength ultraviolet laser that is transmitted through the probe of an atomic force microscope to laser machine an optical grating.

NSOM's use many of the same principles as atomic force microscopes (AFM's) to accurately profile surfaces. Laser micromachining of these surfaces using near-field radiation from an NSOM probe tip may provide a number of advantages compared to using non-near-field radiation and free space optics. The advantages may include precise positioning control of the NSOM probe tip and a reduced minimum feature size. The precise motion stages used in NSOM devices may be used to provide precise horizontal and vertical positioning control. Additionally, the ability of an NSOM to profile a surface allows for the accurate vertical positioning of the probe tip desired to couple significant near-field radiation to the surface. It is noted that other modes than the near-field mode may be transmitted through the NSOM probe tip, but, as long as the probe tip is maintained suitably close to the surface being machined, the possible presence of these other modes does not have a large effect on these advantages of NSOM laser machining.

The minimal feature size that may be machined with an exemplary NSOM laser machining system of the present invention is determined by the size of the NSOM probe tip, rather than by the wavelength of the laser light used to generate the near-field radiation. This may allow a laser machining apparatus, such as that disclosed by Owari et al., to machine areas on a surface, which are smaller than the diffraction limited spot size of a free space laser beam from the same laser source. The wavelength of the laser is still an issue, however, because it affects the efficiency with which the light may be coupled into the near-field through the NSOM probe tip. Thus, Owari et al. disclose the use of short wavelength UV lasers with wavelengths approximately equal to the diameters of the circular cross-sections of their NSOM probe tips.

An important issue in such a system is ensuring that the laser light is efficiently coupled into, and out of, the NSOM probe.

The tip of the NSOM probe is desirably formed to allow light in the near-field mode to be coupled through the probe tip, while substantially preventing light from being transmitted in the far-field mode. The probe tip may be imaged in a scanning electron microscope (SEM) and the tip quality assessed based on its appearance, but this method does not provide a direct measurement of the light coupled through the tip. Thus, it may be difficult, or even impossible, to calibrate the probe tips using SEM images only. Additionally, taking SEM images of the probe tip requires removing the NSOM probe from the NSOM. SEM imaging may be desirable to initially screen NSOM probes for defective NSOM tips, but it is impractical for monitoring of the probe tips during operation for wear and/or damage. Therefore, a means to measure the power of light coupled through NSOM probe tips, particularly the power of light coupled into the near-field mode, is desirable.

SUMMARY OF THE INVENTION

An exemplary embodiment of the present invention is a system for measuring radiation at a laser peak wavelength that is radiated from a probe tip of a near-field scanning optical microscope (NSOM) probe used for laser machining. The system includes: a laser source to generate laser light with the peak wavelength; the NSOM probe; a coupling substrate formed of a material that is substantially transmissive to the laser peak wavelength; an NSOM mount to controllably hold the NSOM probe and the coupling substrate; an NSOM probe monitor coupled to the NSOM mount; an NSOM controller; and a photodetector optically coupled to the coupling substrate. The NSOM probe has a substantially cylindrical shape. The laser light generated by the laser source is optically coupled into the NSOM probe through an input plane at one end of the NSOM probe. The probe tip is located at another end of the NSOM probe. The NSOM mount includes a Z motion stage coupled to either the NSOM probe or the coupling substrate. The NSOM probe monitor determines the distance between the probe tip of the NSOM probe and the top surface of the coupling substrate. The NSOM controller is coupled to the NSOM probe monitor and the Z motion stage. It controls the vertical position of whichever of the NSOM probe or the coupling substrate is coupled to the Z motion stage. This vertical position is controlled based on the distance between the probe tip of the NSOM probe and the top surface of the coupling substrate determined by the NSOM probe monitor such that radiation is coupled from the probe tip of the NSOM probe into the coupling substrate. The photodetector measures the power of the radiation coupled from the probe tip of the NSOM probe into the coupling substrate.

Another exemplary embodiment of the present invention is an NSOM for laser machining a feature on a surface of a microstructure workpiece using a laser source. The NSOM includes: a laser source to generate laser light with the peak wavelength; an NSOM probe having a substantially cylindrical shape; a coupling substrate formed of a material that is substantially transmissive to the laser peak wavelength; a substrate holder to hold the coupling substrate and the microstructure workpiece; an NSOM mount to controllably hold the NSOM probe and the substrate holder; a NSOM probe monitor coupled to the NSOM mount; an NSOM controller; and a photodetector optically coupled to the coupling substrate. The laser light generated by the laser source is optically coupled into the NSOM probe through an input plane at one end of the NSOM probe. A probe tip is located at another end of the NSOM probe. The coupling substrate includes a top surface with a window portion. The NSOM mount includes an XY motion stage and a Z motion stage. Each motion stage is coupled to either the NSOM probe or the substrate holder. The NSOM probe monitor determines the distance between the probe tip of the NSOM probe and either the top surface of the coupling substrate or the surface of the microstructure workpiece. The NSOM controller is coupled to the NSOM probe monitor, the XY motion stage, and the Z motion stage. It controls either: 1) (during NSOM calibration) the vertical position of whichever of the NSOM probe or the substrate holder is coupled to the Z motion stage based on the distance between the probe tip of the NSOM probe and the top surface of the coupling substrate determined by the NSOM probe monitor such that radiation is coupled from the probe tip of the NSOM probe into the coupling substrate and a horizontal position of whichever of the NSOM probe or the substrate holder is coupled to the XY motion stage based on a location of the feature window portion of the top surface of the coupling substrate; or 2) (during laser machining) the vertical position of whichever of the NSOM probe or the substrate holder is coupled to the Z motion stage based on the distance between the probe tip of the NSOM probe and the surface of the microstructure workpiece determined by the NSOM probe monitor and a horizontal position of whichever of the NSOM probe or the substrate holder is coupled to the XY motion stage based on a location of the feature to be laser machined on the surface of the microstructure workpiece. The photodetector measures the power of the radiation coupled from the probe tip of the NSOM probe into the coupling substrate during NSOM calibration.

A further exemplary embodiment of the present invention is a method for calibrating an NSOM probe of an NSOM laser machining system that includes a laser source, the NSOM probe, a coupling substrate, and a photodetector. The probe tip of the NSOM probe is aligned over the top surface of the coupling substrate. The distance between the probe tip and the top surface of the coupling substrate is determined and this distance is controlled such that the distance is substantially equal to a calibration distance. Laser light having a predetermined power and a laser peak wavelength is generated using the laser source. The laser light into the NSOM probe of the NSOM laser machining system and a portion of the laser light is coupled through the probe tip of the NSOM probe into the coupling substrate. The coupled power of the portion of the laser light coupled into the coupling substrate is detected using the photodetector. The coupling of the laser light into the NSOM probe is adjusted until the coupled power of the portion of the laser light coupled into the coupling substrate is substantially optimized.

An additional exemplary embodiment of the present invention is a method for laser machining a feature on a microstructure workpiece using an NSOM laser machining system that includes a laser source, an NSOM probe, a coupling substrate, and a photodetector. The microstructure workpiece is mounted in the NSOM laser machining system. The probe tip of the NSOM probe is aligned over the top surface of the coupling substrate. The distance between the probe tip and the top surface of the coupling substrate is determined and this distance is controlled such that the distance is substantially equal to a calibration distance. Laser light having a predetermined calibration power and a predetermined power and a laser peak wavelength is generated using the laser source. The laser light into the NSOM probe of the NSOM laser machining system and a portion of the laser light is coupled through the probe tip of the NSOM probe into the coupling substrate. The coupled power of the portion of the laser light coupled into the coupling substrate is detected using the photodetector. The coupling of the laser light into the NSOM probe is adjusted until the coupled power of the portion of the laser light coupled into the coupling substrate is substantially optimized. The probe tip of an NSOM probe is realigned over a machining surface of the microstructure workpiece and the laser source is adjusted to generate laser light having a machining power based on the coupled power detected during calibration. The distance between the probe tip and the machining surface is detected and controlled such that the distance is substantially equal to a machining distance. The portion of the laser light is coupled through the probe tip of the NSOM probe and onto an irradiated area of the machining surface of the microstructure workpiece corresponding to a location of the probe tip to laser machine the irradiated area. At least one of the NSOM probe or the microstructure workpiece is moved such that the probe tip is scanned over the feature region of the machining surface corresponding to the feature, while maintaining the distance between the probe tip and the machining surface substantially equal to the machining distance and continuing to laser machine the feature on the machining surface of the microstructure workpiece.

Yet another exemplary embodiment of the present invention is an NSOM for laser machining a feature on a surface of a microstructure workpiece using a laser source. The NSOM includes: a laser source to generate laser light with the peak wavelength; an NSOM probe having a substantially cylindrical shape; optics for optically coupling the laser light from the laser source into the NSOM probe; an NSOM mount to controllably hold the NSOM probe and the microstructure workpiece; a NSOM probe monitor coupled to the NSOM mount; and an NSOM controller coupled to the NSOM probe monitor, the XY motion stage, and the Z motion stage. The optics include a holey optical fiber and the laser light generated by the laser source is optically coupled though the holey optical fiber into the NSOM probe through an input plane at one end of the NSOM probe. A probe tip is located at another end of the NSOM probe. The NSOM mount includes an XY motion stage and a Z motion stage. Each motion stage is coupled to either the NSOM probe or the substrate holder. The NSOM probe monitor determines the distance between the probe tip of the NSOM probe and the surface of the microstructure workpiece. The NSOM controller controls the vertical position of whichever of the NSOM probe or the microstructure workpiece is coupled to the Z motion stage based on the distance between the probe tip of the NSOM probe and the surface of the microstructure workpiece determined by the NSOM probe monitor and a horizontal position of whichever of the NSOM probe or the microstructure workpiece is coupled to the XY motion stage based on a location of the feature to be laser machined on the surface of the microstructure workpiece.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 1:
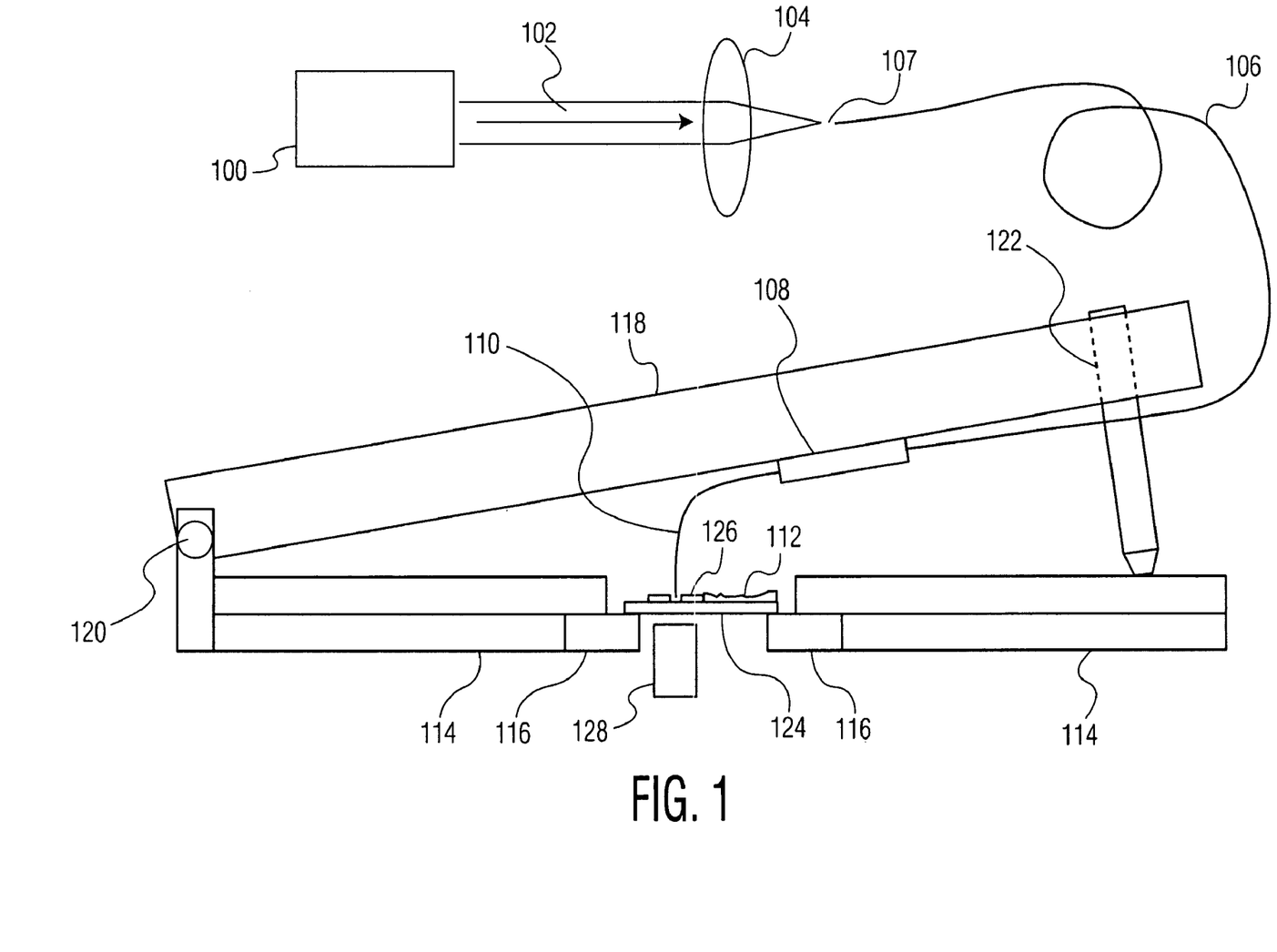
FIG. 1 is a block diagram of an exemplary NSOM laser micro-machining system with calibration means according to the present invention.

FIG. 1 illustrates a simplified block diagram of an exemplary NSOM laser machining system of the present invention, including an exemplary means of measuring light coupled through the NSOM probe tip. This light may desirably include near-field mode light evanescently coupled from the NSOM probe tip to a coupling substrate, and may also include far-field mode light or other light coupled through the NSOM probe tip.

Quantum cellular automata, coupled quantum dot devices, resonant tunneling devices, multifunction optical arrays, diffractive optical elements, beam shapers, microlens arrays, optical diffusers, beam splitters, laser diode correctors, fine pitch gratings, photonic crystals, micro-electrical-mechanical systems, micro-circuitry, micro-surface-acoustic-wave devices, micro-mechanical oscillators, polymerase chain reaction microsystems, biochips for detection of hazardous chemical and biological agents, high-throughput drug screening and selection Microsystems, and molds to form other microstructures are examples of microstructures that may be machined by an exemplary NSOM laser micromachining system of the present invention. These microstructures may be manufactured, repaired, or customized using such an exemplary system.

This exemplary NSOM laser machining system includes laser source 100, NSOM probe 110 (including optical fiber portion 106), and NSOM probe holder 108 to generate and transmit pulses of laser light to workpiece 112, as well as optics 104 to couple optical beam 102 into optical fiber 106 though input plane 107 and numerous NSOM components to position NSOM probe 110. The exemplary system also includes coupling substrate 124 with opaque mask layer 126 formed on its top surface and photodetector 128 to measure radiation coupled into coupling substrate 124 from NSOM probe 110.

It is noted that an ultrafast laser source may desirably be used in the exemplary system of FIG. 1. Ultrafast laser sources may provide significantly higher peak power levels than longer pulsed laser source (i.e. lasers with pulse durations>1 ns) and CW laser sources. These high peak powers may desirably help overcome the low efficiency with which the laser light is coupled through the probe tip into the near-field mode and/or other modes. Providing higher peak powers in NSOM probe 110 may allow the use of even smaller NSOM probe tips compared to the wavelength of laser source 100.

In other laser machining applications using free space optics, the use of ultrafast lasers has also been shown to significantly reduce the heat affected zone surrounding laser machined features, as disclosed in U.S. patent application Ser. No. 10/793,543 by M. Li entitled METHOD OF PRECISE LASER NANOMACHINING WITH UV ULTRAFAST LASER PULSES, filed on Mar. 4, 2004. Reducing the heat affected zone may dramatically improve the quality of laser machined features. The same advantage may be obtained in the present invention by use of an ultrafast laser in laser source 100 of the exemplary NSOM laser machining system. Additionally, the increased peak power of ultrafast laser pulses may allow higher amounts of power to be coupled through the probe tip of NSOM probe 110 into the workpiece to be machined. Coupling higher amounts of power through the probe tip of NSOM probe 110 may allow each pulse of laser light to machine a greater depth of the workpiece material of microstructure workpiece 112.

In the exemplary system of FIG. 1, laser source 100 may desirably include any type of solid state gain medium typically used for laser machining applications, such as: Cr:YAG (peak fundamental wavelength, $\lambda_f$=1520 nm); Cr:Forsterite ($\lambda_f$=1230–1270 nm); Nd:YAG and Nd:YVO4 ($\lambda_f$=1064 nm); Nd:GdVO4 ($\lambda_f$=1063 nm); Nd:YLF ($\lambda_f$=1047 nm and 1053 nm); Nd:glass ($\lambda_f$=1047–1087 nm); Yb:YAG ($\lambda_f$=1030 nm); Cr:LiSAF ($\lambda_f$=826–876 nm); Ti:Sapphire ($\lambda_f$=760–820 nm); Pr:YLF ($\lambda_f$=612 nm); and most recently Yb:KGW ($\lambda_f$=800 nm). These solid state gain media may be pumped using standard optical pumping systems such as erbium doped fiber lasers and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element also includes optics to substantially collimate the laser light. An additional, non-solid state, single or multiple pass amplifier such as a XeCl, KrF, ArF, or $F_2$ excimer amplifier (not shown) may be included to increase the output power of laser source 100.

Although laser source 100 may produce longer pulses of laser light, or even be CW, it desirably produces pulses of laser light, which have a duration of less than about 1 ns. These pulses may desirably have durations of less than about 20 ps, and in many cases their durations may be less than 200 fs. The pulses of laser light produced by laser source 100 may desirably be nearly Fourier-transform limited.

Alternatively, laser source 100 may include an excimer laser system (e.g. XeCl, $\lambda_f$=308 nm; KrF, $\lambda_f$=248 nm; ArF, $\lambda_f$=193 nm; or $F_2$, $\lambda_f$=157 nm) or a dye laser system (e.g. 7-diethylamino-4-methylcoumarin, $\lambda_f$=435–500 nm; benzoic acid, 2-[6-(ethylamino)-3-(ethylimino)-2,7-dimethyl-3H-xanthen-9-yl]-ethyl ester, monohydrochloride, $\lambda_f$=555–625 nm; 4-dicyanmethylene-2-methyl-6-(p-dimethylaminostyryl)-4H-pyran, $\lambda_f$=598–710 nm; or 2-(6-(4-dimethylaminophenyl)-2,4-neopentylene-1,3,5-hexatrienyl)-3-methylbenzothiazolium perchlorate, $\lambda_f$=785–900 nm).

It may be desirable for laser source 100 to have a peak wavelength of less than approximately 400 nm. A harmonic generation crystal may be used within this component to reduce the peak wavelength of the pulses of laser light. Desirably, a frequency-doubled, 150 fs Ti:Sapphire laser (for example a Clark MXR CPA2000) may be used as laser source 100.

The output laser beam 102 of laser source 100 may be focused by optics 104 into optical fiber portion 106 of NSOM probe 110, which desirably has a fiber core formed of a waveguide material that has low absorptivity near the peak wavelength of the laser light. The light is coupled into optical fiber portion 106 through input plane 107. Additionally, optics 104 may include optical components to control the intensity, polarization, and/or collimation of laser beam 102. A polarization controller may be included in optics 104 to control the polarization of the laser light generated by the laser source 100. This laser light may be desirably circularly polarized. A shutter and/or a variable attenuator may be included in optics 104. These components may be coupled to control circuitry of the NSOM (not shown) to control the properties of the laser light coupled into NSOM probe 110 during the machining of features on the surface of microstructure workpiece 112. The various components of optics 104 may also be adjusted during measurement of the portion of the radiation coupled from NSOM 110 to coupling substrate 124 to calibrate the exemplary NSOM laser machining system.

Optical fiber portion 106 is a part of NSOM probe 110 and the cleaved end of optical fiber 106 functions as input plane 107 of NSOM probe 110. NSOM probe 110, including its optical fiber portion 106, is held in NSOM probe holder 108. It is noted that optics 104 may also include an optical fiber separate from NSOM probe 110.

In this alternative embodiment, the optical fiber in optics 104 and optical fiber portion 106 of NSOM probe 110 are aligned to allow for low loss coupling of the pulses of laser light into the NSOM probe. Input plane 107 of NSOM probe 110 is desirably a cleaved fiber end having an input area approximately equal to a cross-sectional area of the cleaved end of the optical fiber of optics 104. The length of optical fiber portion 106 may be shortened substantially to reduce dispersion or other undesirable nonlinear effects in this embodiment. The optical fiber in optics 104 may be a solid fiber or may be a holey fiber that has minimal dispersion and nonlinear effect. It may be difficult, however, to use a holey fiber to form an NSOM probe due to its hollow or porous fiber core. Optics 104 may also include components, such as a ball lens, to assist in optically coupling between these optical fibers.

One or both of optics 104 and optical fiber portion 106 desirably include mounts (not shown) with mechanical components, such as linear and rotational motion stages, to allow adjustment of coupling parameters, including the location, angle, and/or focus of the laser light beam incident on input plane 107. These coupling parameters may desirably allow the power of the radiation coupled into coupling substrate 124 to be optimized.

NSOM probe 110 is formed in a substantially cylindrical shape. The cross-sectional shape of NSOM probe 110, including optical fiber portion 106, may desirably be circular or another elliptical shape, or alternatively may be another shape used for waveguides, such as rectangular, and may change in size or shape along its length. For example, the substantially cylindrical shape of NSOM probe 110 tapers near its tip end to produce the probe tip. Additionally, it is contemplated that the substantially cylindrical shape of NSOM probe 110 may include a bend along its axis, as shown in FIG. 1.

Figure 2:
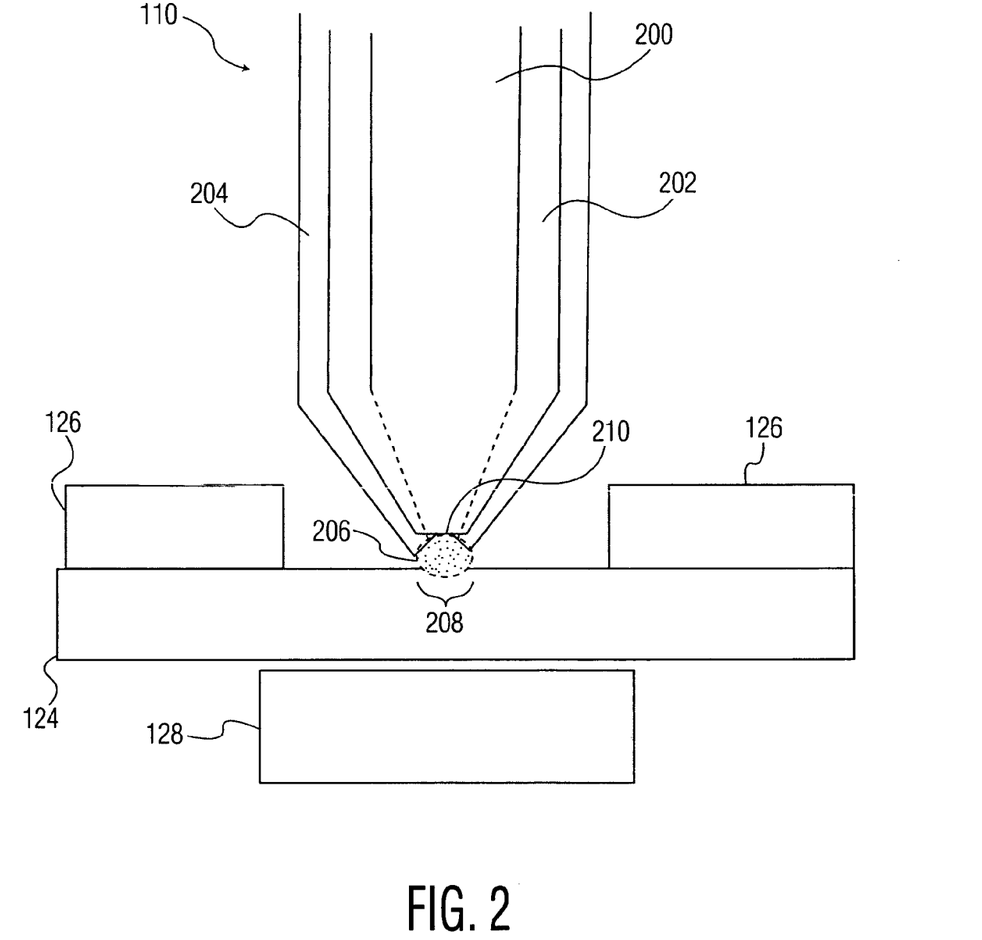
FIG. 2 is a side cut-away drawing of an exemplary NSOM probe and calibration means according to the present invention cut along a diameter of the exemplary NSOM probe.

FIG. 2 illustrates a close view of the tip end of exemplary NSOM probe 110, as well as its desirable relationship to coupling substrate 124, opaque mask layer 126, and photodetector 128, during calibration. The end of the NSOM probe including the optical fiber portion 106 is not shown in FIG. 2. Probe tip 210, which is located at the other end of NSOM probe 110 from input plane 107, is shown. NSOM probe 110 includes a portion of optically transmissive core 200 and may also include a portion of cladding layer 202, as shown. In probe tip 210 the materials of optically transmissive core 200 and cladding layer 202 may be indistinguishable, illustrated by the dashed lines separating these materials in the tip region of the exemplary tip in FIG. 2. NSOM probe tip 210, from which coupled radiation portion 206 emanates, may desirably have cross-sectional area of less than a square of the peak wavelength of the pulses of laser light and an elliptical cross-sectional shape, which allows machining of similar elliptical shapes with axes shorter than the peak wavelength.

Optically transmissive core 200 desirably extends from input plane 107 to probe tip 210 and is optically coupled to laser source 100 through optics 104 at input plane 107. Optically transmissive core 200 of NSOM probe 110 is formed of a material that has low absorptivity near the peak wavelength of the laser light. Cladding layer 202 also desirably extends from input plane 107 to probe tip 210 to help confine the laser light within transmissive core 200, but may be omitted if sufficient confinement may occur without it.

Figure 3:
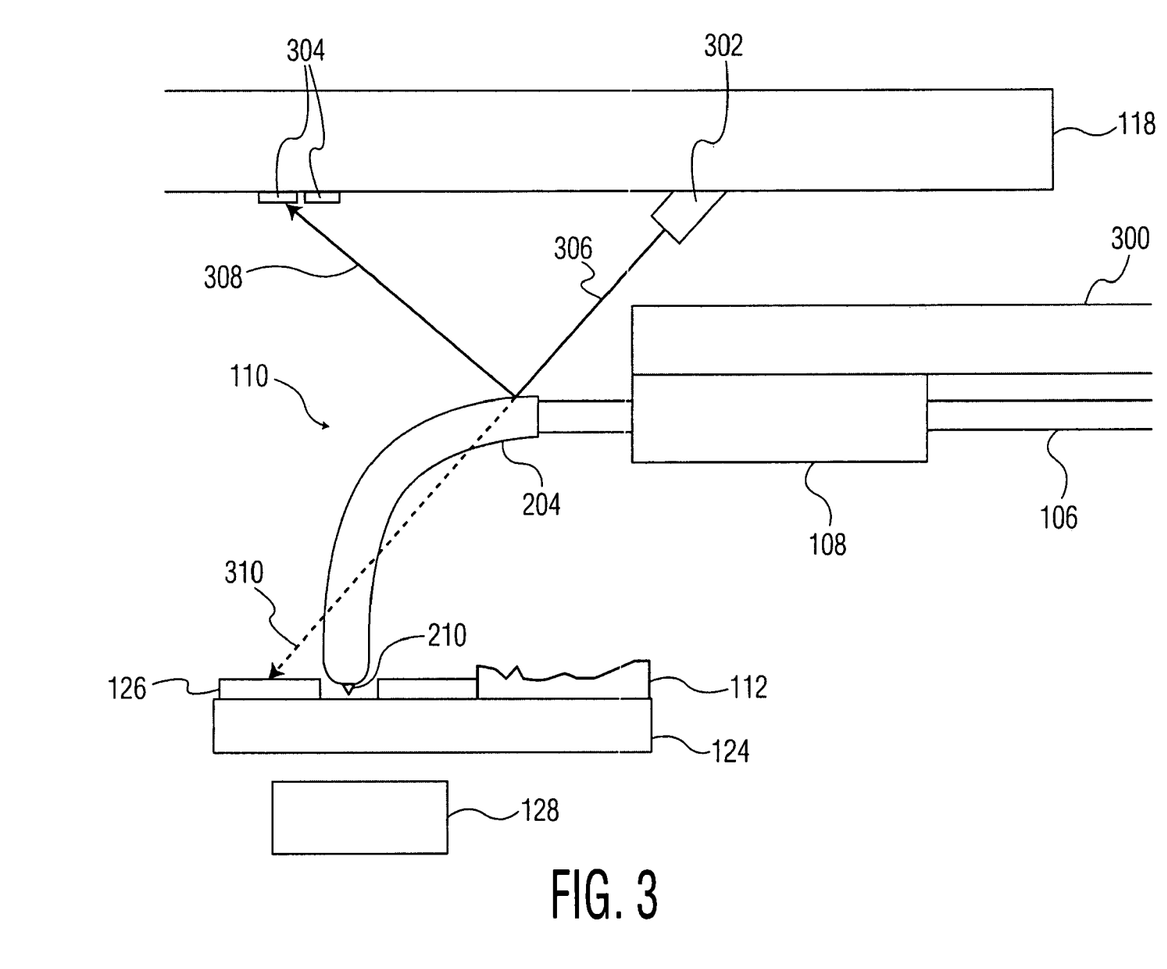
FIG. 3 is a side plan drawing of an exemplary NSOM probe, probe holder, probe position monitor configuration, and calibration means according to the present invention.

Radiation confinement coating 204 is also formed on NSOM probe 110 and extends from adjacent to probe tip 210 along the side surface of the probe. Radiation confinement coating 204 provides additional confinement of the laser light in optically transmissive core 200 in sections of NSOM probe 110 that may otherwise be particularly leaky, such as the narrow section near probe tip 210 and any sections with a tight radius of curvature. Additionally, radiation confinement coating 204 substantially defines the area of probe tip 210, by its absence. It may extend as far as or to an opening adjacent to input plane 107, or may only extend a portion of that distance. In an exemplary embodiment in which the NSOM probe has a 90° bend it is desirable for radiation confinement coating 204 to extend at least around the bend, as shown in FIG. 3. Radiation confinement coating 204 has high reflectivity near the peak wavelength of the laser light and desirably has low absorptivity in this band as well. It may include at least one metal and/or dielectric layer. It is further noted, as shown in FIG. 3, that it may be desirable for radiation confinement coating 204 to be substantially reflective to light that may be used for optically monitoring the position of NSOM probe 110.

As shown in FIG. 2, coupled radiation portion 206 extends from probe tip 210 to irradiated area 208 of the top surface of coupling substrate 124. Coupling substrate 124 is desirably a planar substrate formed of a material that is substantially transparent to light having the peak wavelength of laser source 100. This may allow near-field mode and other modes in coupled radiation portion 206 to be transmitted through coupling substrate 124 once it has been coupled to irradiated area 208 so that it may be detected by photodetector 128. Even though coupling substrate 124 is selected to have minimal absorption of coupled radiation portion 206, during calibration, it may be desirable to use a lower laser power during calibration than during laser machining to prevent undesirable machining of coupling substrate 124. This may be particularly important when an ultrafast laser source is used.

Various optical materials, such as glass, plastic, and various dielectrics may be used for coupling substrate 124 depending on the peak wavelength of laser source 100. Due to the desirably small size of probe tip 210 and the desire to not machine coupling substrate 124, the total power of coupled radiation portion 206 is typically very small. Therefore, it may be desirable for coupling substrate to be formed of a material that may act as a filter to improve the signal to noise ratio (S/N) of the light detected by photodetector 128 by selectively allowing light having the spectral properties of coupled radiation portion 206, while being substantially non-transmissive to other optical sources that have different peak wavelengths. For example, ionically colored filter glasses, such as Schott Glass Technologies BG-3 or UG-1 glasses, may be used in an exemplary NSOM laser machining system using an ultraviolet laser source ($\lambda \leqq 400$ nm) to substantially block most longer visible and infrared wavelengths.

Opaque mask 126 may also be used to improve the S/N of the light to be measured by substantially blocking light from other sources. These other light sources may include leakage light from the cladding of fiber portion 106 and gaps in radiation confinement layer 204, the scattering of beam 102 by any optics or ambient elements between laser 100 and input plane 107, ambient light, and light from a tracking beam of the NSOM as shown in FIG. 3. Opaque mask 126 is desirably formed on the top surface of coupling substrate 124 out an easily deposited, non-transmissive material, such as paint, epoxy, photoresist, metal or dielectric coatings. Alternatively, opaque mask 126 may be formed separately and coupled to coupling substrate 124. As shown in FIGS. 1, 2, and 3, opaque mask 126 has a pinhole to expose a window portion of coupling substrate 124. This pinhole is desirably larger than the area of probe tip 210 plus two times of the coating thickness. Although a smaller window portion may better baffle the signal, the size of the window portion may desirably be larger than the optical resolution of an optical microscope (not shown) used for system alignment to allow the window to be optically located. It may desirably expose a window portion of coupling substrate 124 having a surface area as large as 30 µm². The background level has been measured experimentally to be no more than 0.5% of the signal size when a 30 µm² window portion is used on coupling substrate 124.

Figure 6A:
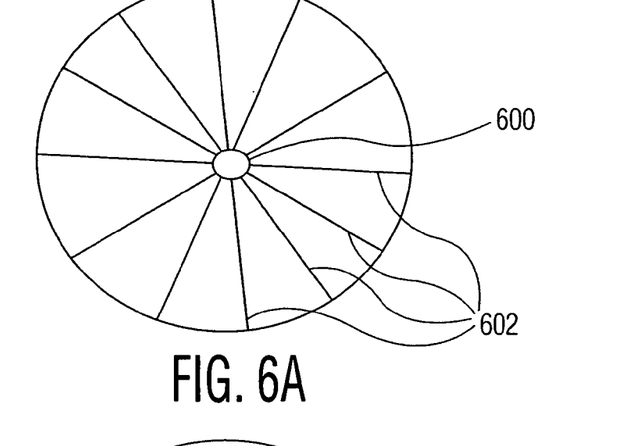
FIGS. 6A–C are top plan drawings illustrating exemplary orientation marks that may be used for alignment during NSOM calibration according to the present invention.
Figure 6B:
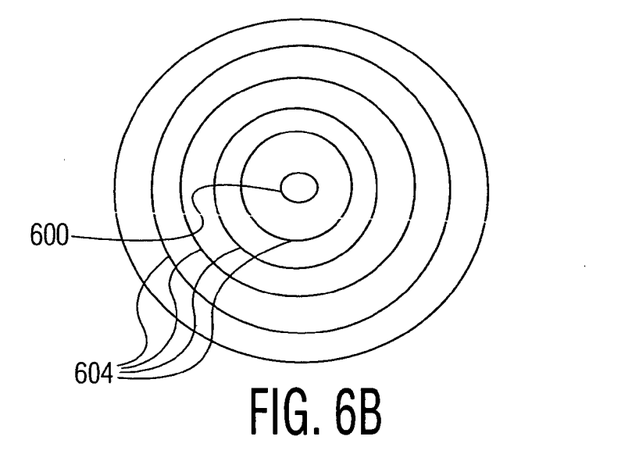
Figure 6C:
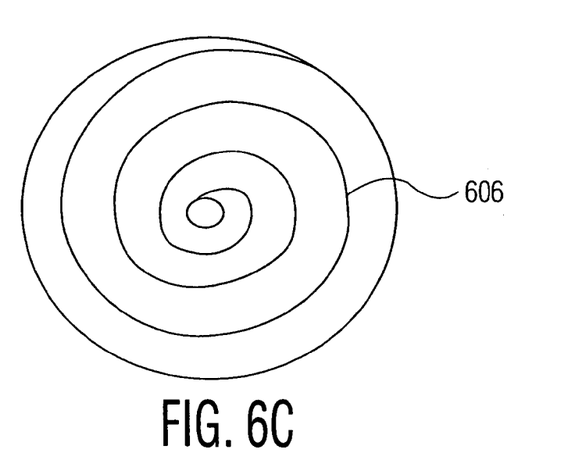

To effectively use such a small window portion on a typical size coupling substrate 124 with an opaque mask covering an area on the order of 1 cm², an orientation mark, such as those as shown in FIGS. 6A–C, to index the location of the window may be desired. FIG. 6A illustrates one example in which radial lines 602 cross each other right at the location of window portion 600. FIG. 6B includes an alternative example of a series of concentric rings 604 with various diameters which are centered on window portion 600. Although, concentric circles as shown in FIG. 6B may be preferable, other concentric rings such as concentric polygons (i.e. squares, hexagons, triangles, etc.) may be used as well. FIG. 6C includes a third exemplary orientation formed as spiral 606, which converges on window portion 600. Under the small field of high-magnification microscope, these exemplary orientation marks may provide a guide to locate small micron-size window portions quickly during the calibration operations. As described above with regard to the size of the window portion, the width of the lines used to form these orientation mark are desirably within the optical resolution of an optical microscope used for system alignment so that they may be found on the surface of the opaque mask. Also sufficient contrast to be easily imaged is desirable. These calibration marks may be formed by a number of techniques including scribing, etching, deposition, painting, printing, etc. The three exemplary orientation marks shown in FIGS. 6A–C are merely examples and are not limiting.

Due to the small amount of total power coupled into coupling substrate 124 for detection, it is desirable for photodetector 128 to be very sensitive and/or have a high gain. For example, a high gain photomultiplier tube or avalanche photodiode, with gains in the range of 10⁶, may be desirable. Such detectors may have a variable gain that may be set very high to begin with and lowered as the coupling parameters between optics 104 and NSOM probe 110. Additionally, avalanche photodiodes may have such an extremely high sensitivity that they can be used for photon counting, thus, allowing very low coupled light levels to be sensed. The sensitivity and/or high gain of photodetector 128 also drives the desired to increase the S/N of the light being measured so as not to saturate the photodetector. It is noted that photodetector 128 may also help avoid the potential saturation problem by being selected to have higher sensitivity at wavelengths near the peak wavelength of laser source 100.

Returning to FIG. 1, NSOM probe holder 108 is coupled to an NSOM mount to controllably hold and position NSOM probe 110. The NSOM mount also controllably holds and positions coupling substrate 124 and microstructure workpiece 112 relative to NSOM probe 110. The NSOM mount includes top support 118 which is connected to NSOM base 114 by hinge 120. This configuration permits NSOM probe 110 to be easily lifted away from coupling substrate 124 and microstructure workpiece 112 to allow inspection and/or replacement of the probe or mounting and dismounting of workpieces. Gross vertical, or Z, positioning of NSOM probe 110 over microstructure workpiece 112 may be accomplished using set screw 122 which may be coupled to a lead screw (not shown) or a stepper motor (not shown).

The exemplary NSOM mount of FIG. 1 also includes workpiece positioning section 116 which includes a substrate holder to hold coupling substrate 124 and microstructure workpiece 112. Workpiece positioning means 116 is coupled to NSOM base 114. It is noted that, although the exemplary embodiment of FIG. 1 includes workpiece positioning means 116 for positioning microstructure workpiece 112 relative to NSOM probe 110, one skilled in the art may understand that a positioning means to position NSOM probe 110 relative to microstructure workpiece 112 may be used in addition to, or in place of, workpiece positioning means 116.

Workpiece positioning means 116 may include, for example, a computer-controlled XYZ motion stage with micrometer resolution (for example, a micron resolution XYZ motion stage manufactured by Burleigh). A computer-controlled, piezo-electric XY motion stage with nanometer-resolution (for example, a piezo-electric XY motion stage manufactured by Queensgate) may also be included. Fine Z positioning may be accomplished using a piezo-electric Z motion stage in workpiece positioning means 116. These computer-controlled motion stages of workpiece positioning means 116 may be used to position the NSOM of the laser micro-machining system over the surface of microstructure workpiece 112, with the micrometer resolution XYZ motion stage providing coarse positioning and the piezo-electric motion stages providing fine positioning. Alternatively, other fine motion stages capable of nanometer resolution may be used to provide fine positioning.

An exemplary NSOM laser micromachining system of the present invention also includes an NSOM control system. One exemplary NSOM control system is illustrated in FIG. 3. This exemplary NSOM control system includes an NSOM probe monitor and NSOM controller, which is coupled to the NSOM probe monitor, the piezo-electric XY motion stage, and the piezo-electric Z motion stage. The NSOM probe monitor determines the distance between probe tip 210 of the NSOM probe 110 and either the top surface of coupling substrate 124 or the surface of the microstructure workpiece 112 depending on the operation step.

The NSOM controller (not shown) uses this distance information to control the vertical position of either NSOM probe 110 or coupling substrate 124 and microstructure workpiece 112 (or both) by sending a signal to the Z motion stage(s), depending on which is coupled to the positioning means. The NSOM controller may also control the horizontal position of either NSOM probe 110 or coupling substrate 124 and microstructure workpiece 112 by sending a signal to the XY motion stage(s) based on the desired probe position over coupling substrate 124 or microstructure workpiece 112. The NSOM controller may include circuitry or an ASIC, and may include a general purpose computer programmed to drive the motion stages in response to distance information from the NSOM probe monitor and input data regarding the feature to be machined on the surface of the microstructure workpiece.

FIG. 3 illustrates an exemplary NSOM probe monitor based on optical means of making atomic force measurements. This exemplary embodiment includes an NSOM probe with a 90° bend. An alternative exemplary embodiment may include a straight NSOM probe. These embodiments of NSOM probe 110 are merely illustrative and not limiting.

The exemplary NSOM probe monitor in FIG. 3 uses cantilevered arm 300 to couple NSOM probe holder 108 to NSOM top support 118. NSOM top support 118 is substantially rigid, while cantilevered arm 300 may move a calibrated amount relative to NSOM top support 118 in a direction substantially normal to the surface of microstructure workpiece 112. This calibrated movement may result from flexing of cantilevered arm 300 or may be due to pivoting of cantilevered arm 300 on the coupling (not shown) between cantilevered arm 300 and NSOM top support 118 in response to atomic force between probe tip 210 and the surface of microstructure workpiece 112. Alternatively, NSOM probe 110 may be periodically oscillated by an NSOM probe oscillator coupled to cantilevered arm 300. The amplitude of this periodic oscillation of NSOM probe 110 is desirably small, in the range of 0 to 20 nm. Changes in one, or both, of the period or amplitude of this periodic oscillation of NSOM probe 110 may provide the calibrated movement for the probe monitor.

The exemplary NSOM probe monitor of FIG. 3 involves an optical sensing method in which light is reflected directly off of radiation confinement coating 204. Light source 302 is coupled to substantially rigid top support 118 as is an optical detector that includes at least two optical regions 304. Light source 302 produces substantially collimated beam of light 306, which is reflected by radiation confinement coating 204 to form reflected beam 308. Reflected beam 308 is then detected by the optical detector. As NSOM probe 110 moves up and down in response to atomic force between probe tip 210 and the surface of coupling substrate 124 or microstructure preform 112, cantilevered arm 300 either flexes or pivots, changing the angle of incidence between substantially collimated beam of light 306 from light source 302 and radiation confinement coating 204. This changes the location at which reflected beam of light 308 is incident of the optical detector. Cantilever flexing may also change the point of incidence which may further change the location at which reflected beam of light 308 is incident of the optical detector. Additionally, possible flexing of NSOM probe 110 due to atomic force may be detected as well. The multiple detector regions 304 allow the optical detector to generate a signal based on an amount of light detected by each detector region. Processing means in the NSOM controller receive this detector signal and may determine the distance between the probe tip of the NSOM probe and the surface of the microstructure workpiece based on the amount of light detected by each detector region 304 of the optical detector. This distance determination by the processing means may involve determining and indicating that the distance between the probe tip of the NSOM probe and the surface of either the coupling substrate or the microstructure workpiece is greater than or less than a desired distance, or may alternatively provide a calibrated distance reading.

FIG. 3 also illustrates excess light beam 310, which may undesirably strike coupling substrate 124 and be detected by photodetector 128. This excess light may result from scattering off of and/or transmission through or around NSOM probe 110, or other components of the NSOM laser machining system. As shown in FIG. 3, opaque mask 126 desirably blocks excess light beam from being coupled into photodetector 128. Substantially collimated beam 306 (as well as excess light beam 310) desirably has a different peak wavelength than laser light 102 from laser source 100. This allows coupling substrate 124 to filter out most of residual excess light beam 310 that is not blocked by opaque mask 126. For example, in an exemplary NSOM laser machining system using laser light at 387 nm for laser machining and light at 632 nm for NSOM probe monitoring, a coupling substrate formed of BG-3 ionically colored filter glass may provide $10^5$ reduction in 632nm light that enters the pinhole in opaque mask 126 compared to 387 nm light entering the pinhole.

Figure 4:
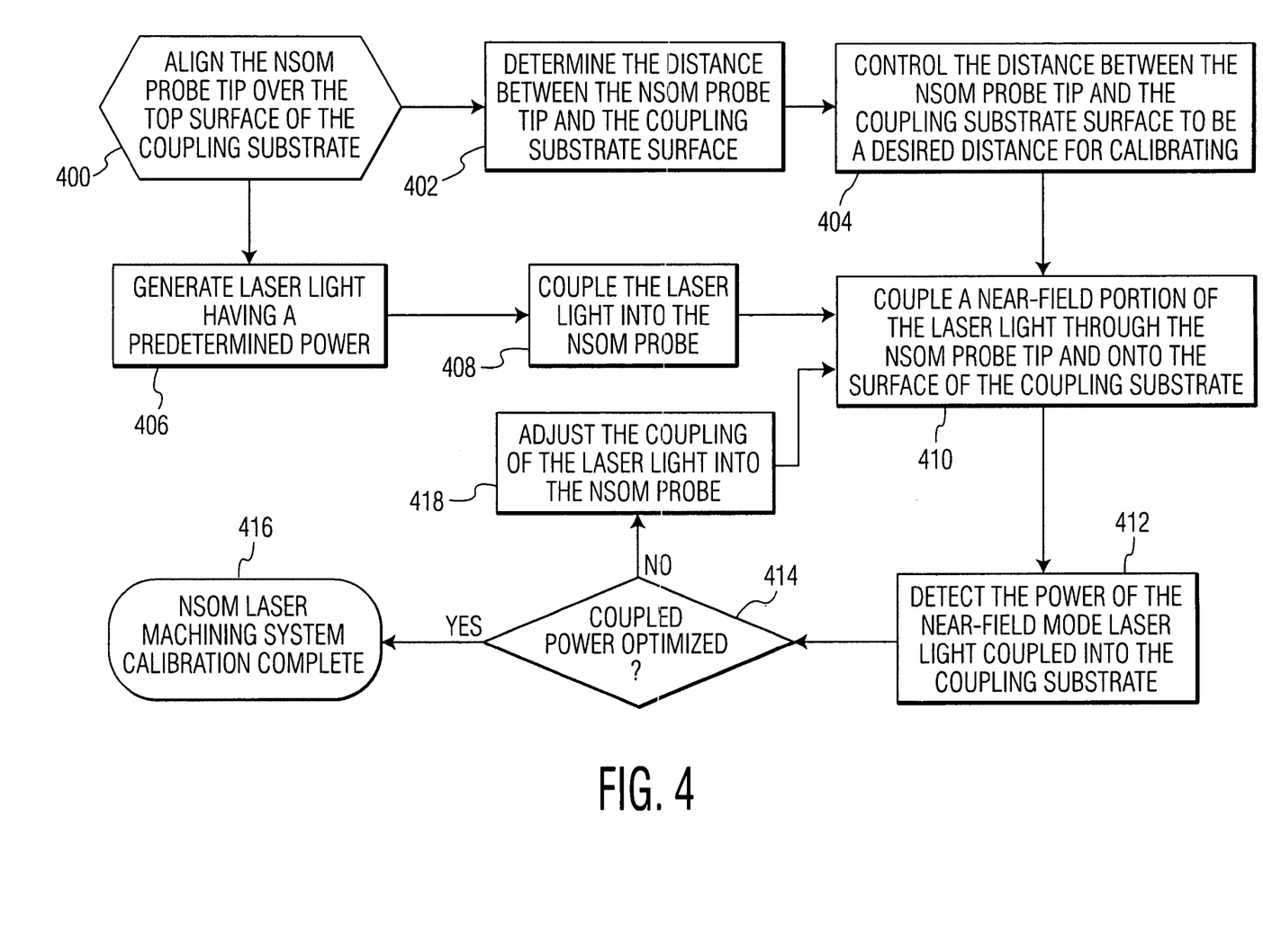
FIG. 4 is a flow chart illustrating an exemplary method of calibrating an NSOM laser machining system according to the present invention.

FIG. 4 illustrates an exemplary method for calibrating an NSOM laser machining system according to the present invention. The exemplary NSOM laser micromachining system of FIG. 1 may be used to perform this exemplary method.

The probe tip of the NSOM probe is aligned over the top surface of the coupling substrate, step 400. As describe above with regard to FIGS. 1, 2, and 3, substantially opaque mask layer 126 may desirably be formed on the top surface of the coupling substrate 124. This substantially opaque mask layer includes a pinhole that exposes a window portion of the top surface of the coupling substrate. In this exemplary embodiment, the probe tip of the NSOM probe is aligned over the window portion of the top surface of the coupling substrate.

The distance between probe tip 210 of NSOM probe 110 and the top surface of coupling substrate 124 is determined, step 402. This distance may desirably be determined by detecting the atomic force between probe tip 210 and the surface as described above with reference to the exemplary embodiment of FIG. 3.

The distance between probe tip 210 and the top surface of coupling substrate 124 is then controlled to be substantially equal to a desired calibration distance, step 404. The desired calibration distance is based on a number of factors including the power of the laser light, its peak wavelength, the size of probe tip 210, and the optical and thermal properties of the coupling substrate, but is desirably in the range of up to about half of the wavelength of the laser light generated by laser source 100. The distance between probe tip 210 of NSOM probe 110 and the top surface of coupling substrate 124 is desirably controlled using a piezo-electric, or other fine motion, Z motion stage to control a vertical position of either the NSOM probe or the substrate. The amount of drive voltage applied to the motion stage is based on the distance between probe tip 210 and the top surface of coupling substrate 124 determined in step 402. It is desirable that the distance between probe tip 210 and the top surface of coupling substrate 124 be controlled with a tolerance of less than 5 nm.

As the NSOM is positioning the probe tip in steps 402 and 404, laser source 100 is used to generate laser light having a predetermined power and peak wavelength, step 206. A harmonic generating crystal may be used to produce laser light having a shorter peak wavelength from the initial laser light generated by laser source 100. Additionally, an attenuator may be included in laser source 100 to control the power of the laser light, producing laser light having the predetermined power. A polarization controller may be used to adjust the polarization of the pulses to be substantially circular. Laser source 100 of the NSOM laser machining system may desirably include a pulsed laser, such as an ultrafast laser to generate pulses of laser light having the laser peak wavelength, a predetermined pulse energy, and a predetermined pulse duration. The predetermined pulse duration of such pulsed laser light may desirably be less than 1 ns.

The resulting laser light is coupled into NSOM probe 110, step 408. NSOM probe 110 has a substantially cylindrical shape with probe tip 210 at one end and input plane 107 at the other end. The NSOM laser machining system also desirably includes optics for coupling the laser light from the laser source into an input plane of the NSOM probe, as described above with reference to FIG. 1.

As shown in FIG. 2, once the distance between probe tip 210 and the top surface of coupling substrate 124 has been set to the desired calibration distance in step 404 and the laser light is coupled into NSOM probe 110 in step 408, a coupled radiation portion 206 of the laser light is transmitted through probe tip 210 of the NSOM probe and is evanescently coupled onto irradiated area 208 of the top surface and from there into coupling substrate 124, step 410. Irradiated area 208 desirably mimics the shape and size of probe tip 210 and corresponds to the horizontal location of probe tip 210. As described above with regard to FIG. 2, probe tip 210 desirably has an elliptical cross-sectional shape and a tip area less than a square of the peak wavelength of the pulses of laser light. The coupled power of coupled radiation portion 206 of the laser light that is coupled into coupling substrate 124 is then detected, step 412, using photodetector 128. Photodetector 128 is desirably shielded from other light sources.

The coupled power of coupled radiation portion 206 detected by photodetector 128 is analyzed to determine if the coupled power has been substantially optimized, step 414. If the coupled power is determined to be substantially optimized, then the NSOM laser machining system calibration is complete, step 416. Otherwise, the coupling of the laser light into NSOM probe 110 is adjusted, step 418, the results of this adjustment tested by repeating steps 410, 412, and 414. Adjusting the coupling of the laser light into NSOM probe is desirably accomplished by adjusting optics 104 and/or the position of input plane 107 of NSOM probe 110 to alter the angle, position, polarization, or focus of laser light incident on input plane 107. Steps 418, 410, 412, and 414 may be repeated until the coupled power of coupled radiation portion 206 of the laser light coupled into coupling substrate 124 is substantially optimized or until it is determined that NSOM probe 110 is defective.

Optimizing the coupled power may involve: maximizing the coupled power from the NSOM probe that is coupled into coupling substrate; or setting the coupled power of the coupled radiation portion of the laser light coupled into the coupling substrate in step 410 to a predetermined calibrated power. To maximize the coupled power, a number of iterations of steps 418, 410, 412, and 414 may be performed to determine the optimal setting of optics 104 and/or the position of input plane 107. To set the coupled power above the predetermined calibrated power, various settings of optics 104 and/or the position of input plane 107 may be selected until the desired power level is reach or a predetermined number of settings have been tried unsuccessfully.

Figure 5:
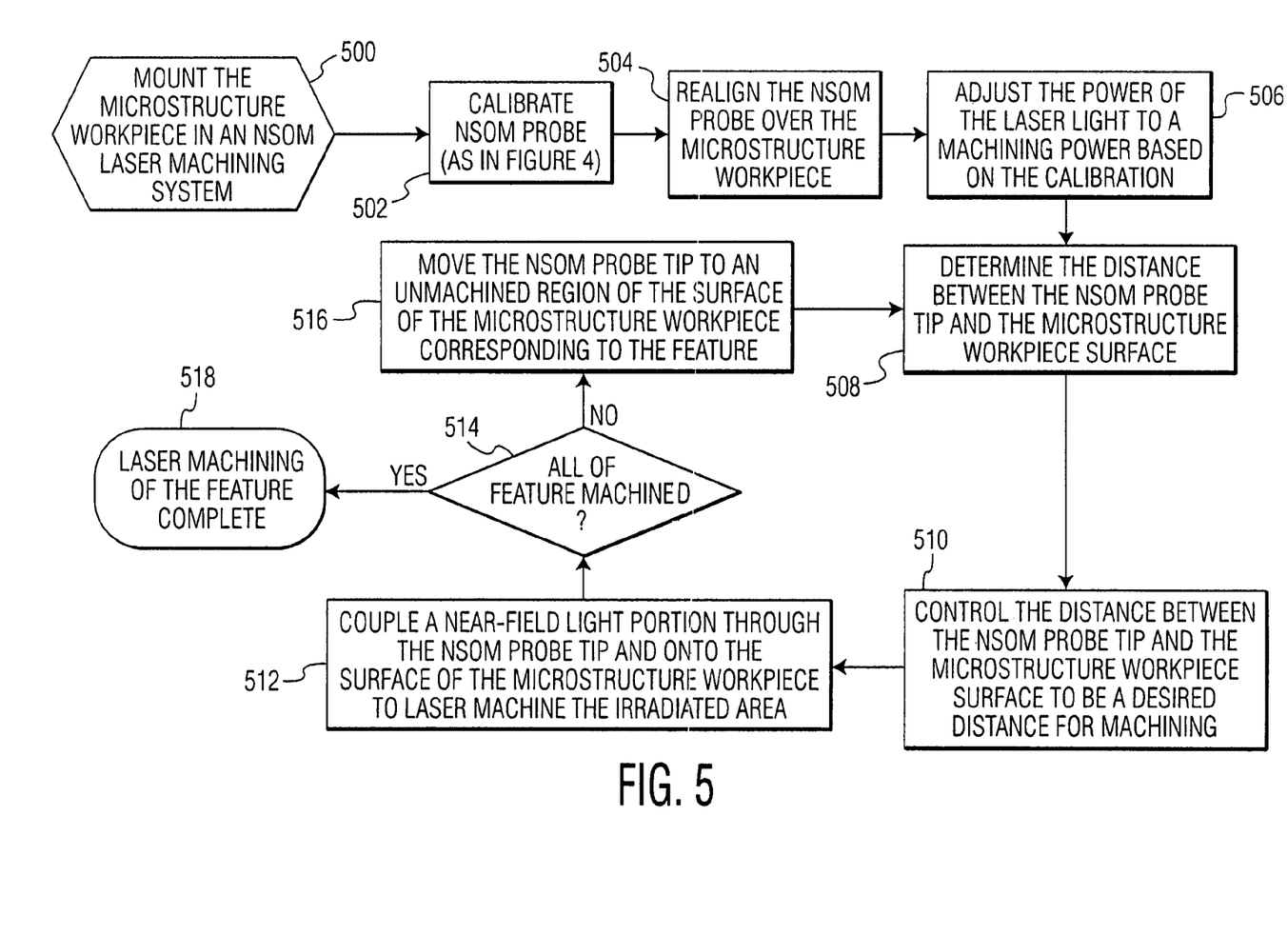
FIG. 5 is a flow chart illustrating an exemplary method of laser machining a feature of a microstructure according to the present invention.

FIG. 5 illustrates an exemplary method for laser machining a feature on a microstructure workpiece using a calibrated NSOM laser machining system according to the present invention. The exemplary NSOM laser machining system of FIG. 1 may be used to perform this exemplary method. Microstructure workpiece 112 is mounted in the NSOM laser machining system, step 500. The NSOM probe is then calibrated, step 502, to provide substantially optimized coupled power for machining the surface of the microstructure workpiece. Step 502 may be desirably performed using the exemplary method of FIG. 4.

NSOM probe 110 is then realigned over the microstructure workpiece, step 504, and the power of the laser light is adjusted to a machining power, step 506, to begin laser machining the feature. The machining power is determined based upon the optimized coupled power from the NSOM probe calibration. This in-situ NSOM probe calibration and the use of the coupled power detected during the calibration to set the machining power used during laser machining of the feature allows for more precise and greater control over the laser machining process.

The distance between probe tip 210 of NSOM probe 110 and a surface of microstructure workpiece 112 is determined, step 508. This distance may desirably be determined by detecting the atomic force between probe tip 210 and the surface as described above with reference to the exemplary embodiment of FIG. 3.

The distance between probe tip 210 and the surface of the microstructure workpiece 112 is then controlled to be substantially equal to a desired machining distance, step 510. The desired machining distance is based on a number of factors including the peak power of the pulses of laser light, their peak wavelength, the size of probe tip 210, and the type of machining to be accomplished, but is desirably in the range of up to about half of the wavelength of the pulses of light used for machining the surface. This machining distance may desirably be the same as the calibration distance used in step 502. The distance between probe tip 210 of NSOM probe 110 and the surface of the microstructure workpiece 112 is desirably controlled using a piezo-electric, or other fine motion, Z motion stage to control a vertical position of either the NSOM probe or the microstructure workpiece. The amount of drive voltage applied to the motion stage is based on the distance between probe tip 210 and the surface of microstructure workpiece 112 determined in step 508. It is desirable that the distance between probe tip 210 and the surface of microstructure workpiece 112 be controlled with a tolerance of less than 5 nm.

Once the distance between probe tip 210 and the surface of microstructure workpiece 112 has been set to the desired machining distance in step 510, a coupled radiation portion of the laser light is coupled into NSOM probe 110 is transmitted through probe tip 210 and is evanescently coupled onto an irradiated area of the surface of microstructure workpiece 112, step 512. This causes the irradiated area to be laser machined by coupled radiation portion. The irradiated area desirably mimics the shape and size of probe tip 210 and corresponds to the horizontal location of probe tip 210. As described above with regard to FIG. 2, probe tip 210 desirably has an elliptical cross-sectional shape and a tip area less than a square of the peak wavelength of the laser light. Laser machining of the irradiated area in step 512 may include: ablating workpiece material of the microstructure workpiece in the irradiated area; laser-assisted chemical vapor depositing deposition material on the surface of the microstructure workpiece in the irradiated area; exposing photoresist on the surface of the microstructure workpiece in the irradiated area; changing an index of refraction of workpiece material of the microstructure workpiece in the irradiated area; altering a lattice structure of workpiece material of the microstructure workpiece in the irradiated area; and changing a chemical composition of workpiece material of the microstructure workpiece in the irradiated area.

It is determined whether the entire feature to be machined has been machined, step 514. If the all of the feature has been machined, then the laser machining of the feature is complete, step 518, and the microstructure workpiece may be removed from the NSOM. If not, then probe tip 210 is moved to an unmachined portion of the surface of microstructure workpiece 112 which corresponds to a portion of the feature, step 516. This may be done by moving either NSOM probe 110 or microstructure workpiece 112.

The exemplary method loops back through steps 508 and 510 to maintain the distance between probe tip 210 and the surface substantially equal to the machining distance and through steps 512, and 514 to laser machine the corresponding portion of the feature at each new position of probe tip 210. Thus, the movement scans the probe tip over the entire feature region of the surface of the microstructure workpiece corresponding to the feature.

If laser source 100 includes a laser oscillator to generate the laser light and a shutter to control emission of the laser light, then probe tip 210 may be scanned over a larger portion of the surface of microstructure workpiece 112 that includes the feature region. The shutter may be opened when probe tip 210 is being scanned over the feature region, thereby allowing laser machining of the feature, and closed when the probe tip is being scanned over other regions of the surface, thereby preventing unwanted laser machining of these other scanned regions of the surface of microstructure workpiece 112.

The present invention includes an exemplary system and exemplary methods to calibrate NSOM laser machining systems, as well as to laser machine surfaces of a microstructure workpiece using near field radiation. The use of these exemplary methods allows greatly simplified, yet highly accurate, micro-machining in ambient atmosphere conditions. Such techniques may help to bring microstructures and nanotechnology into more common use. Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A system for measuring radiation at a laser peak wavelength that is radiated from a probe tip of a near-field scanning optical microscope (NSOM) probe used for laser machining, the system comprising:
   a laser source to generate laser light having the laser peak wavelength;
   the NSOM probe having a substantially cylindrical shape and including:
      an input plane at one end of the NSOM probe, the laser light generated by the laser source being optically coupled into the NSOM probe through the input plane; and
      the probe tip at another end of the NSOM probe;
   a coupling substrate formed of a material that is substantially transmissive to the laser peak wavelength;
   an NSOM mount to controllably hold the NSOM probe and the coupling substrate, the NSOM mount including a Z motion stage coupled to one of the NSOM probe or the coupling substrate;
   an NSOM probe monitor coupled to the NSOM mount for determining a distance between the probe tip of the NSOM probe and a top surface of the coupling substrate;
   an NSOM controller coupled to the NSOM probe monitor and the Z motion stage, the NSOM controller controlling a vertical position of the one of the NSOM probe or the coupling substrate coupled to the Z motion stage based on the distance between the probe tip of the NSOM probe and the top surface of the coupling substrate determined by the NSOM probe monitor such that radiation is coupled from the probe tip of the NSOM probe into the coupling substrate; and
   a photodetector optically coupled to the coupling substrate to measure a power of the radiation coupled from the probe tip of the NSOM probe into the coupling substrate.

2. The system according to claim 1, wherein the laser peak wavelength of the laser light is less than about 400 nm.

3. The system according to claim 1, wherein the laser source includes an ultrafast laser to generate pulses of the laser light having a predetermined pulse duration.

4. The system according to claim 3, wherein the predetermined pulse duration of the pulses of laser light is less than about 20 ps.

5. The system according to claim 1, wherein:
   the laser source includes optics for optically coupling the laser light into the NSOM probe through the input plane; and
   at least one of the optics and a position of the input plane of the NSOM probe are adjusted to substantially optimize the power of the radiation coupled from the probe tip of the NSOM probe into the coupling substrate based on the power of the radiation coupled from the probe tip of the NSOM probe into the coupling substrate measured by the photodetector.

6. The system according to claim 5, wherein:
   the optics of the laser source include a solid core optical fiber to transmit the laser light to the NSOM probe; and
   the input plane of the NSOM probe has an input area approximately equal to a cross-sectional area of the solid core optical fiber.

7. The system according to claim 5, wherein:
   the optics of the laser source include a holey optical fiber to transmit the laser light to the NSOM probe; and
   the input plane of the NSOM probe has an input area approximately equal to a cross-sectional area of a hollow core of the holey optical fiber.

8. The system according to claim 1, wherein a cross-sectional area of the probe tip of the NSOM probe is less than a square of the laser peak wavelength.

9. The system according to claim 1, wherein the NSOM probe further includes:
   an optically transmissive core extending substantially from the input plane to the probe tip, the optically transmissive core portion being optically coupled to the laser source through the input plane; and
   a radiation confinement coating formed on a section of a side surface of the NSOM probe adjacent to the probe tip.

10. The system according to claim 9, wherein the optically transmissive core of the NSOM probe is formed of a waveguide material that has low absorptivity near the laser peak wavelength.

11. The system according to claim 9, wherein the radiation confinement coating has low absorptivity and high reflectivity near the laser peak wavelength.

12. The system according to claim 1,
   wherein the NSOM probe forms a substantially 90° bend between the input plane and the probe tip;
   whereby a propagation direction of the laser light in the NSOM probe is substantially bent 90° between the input plane and the probe tip.

13. The system according to claim 1, wherein the coupling substrate is formed of an ionically colored filter glass.

14. The system according to claim 1, wherein:
   a substantially opaque mask layer is formed on the top surface of the coupling substrate, the substantially opaque mask layer including a pinhole exposing a window portion of the top surface of the coupling substrate; and the NSOM mount further includes an XY motion stage coupled to one of the NSOM probe or the coupling substrate to align the probe tip of the NSOM probe with the window portion of the top surface of the coupling substrate during measurement of the near-field radiation coupled from the probe tip of the NSOM probe into the coupling substrate.

15. The system according to claim 14, wherein the window portion of the top surface of the coupling substrate has a surface area greater than a surface area of the probe tip of the NSOM probe and less than about 30 $\mu m^2$.

16. The system according to claim 14, wherein the substantially opaque mask layer further includes an orientation mark centered on the pinhole to assist in aligning the probe tip of the NSOM probe with the window portion of the top surface of the coupling substrate.

17. The system according to claim 16, wherein the orientation mark includes one of a plurality of radial lines, a plurality of concentric rings, or a spiral.

18. The system according to claim 1, wherein the Z motion stage include a piezoelectric motion stage.

19. The system according to claim 1, wherein:

the NSOM probe monitor includes;
- a light source to produce a substantially collimated beam of light having a monitor peak wavelength;
- a reflective surface coupled to the NSOM probe to reflect a portion of the substantially collimated beam of light;
- an optical detector having at least two detector regions to detect the reflected portion of the substantially collimated beam of light and generate signal based on an amount of light detected by each detector region; and
- processing means to determine the distance between the probe tip of the NSOM probe and the top surface of the coupling substrate based on signals generated by the optical detector; and the material of the coupling substrate is substantially non-transmissive to the monitor peak wavelength.

20. The system according to claim 19, wherein the photodetector is more sensitive to light having the laser peak wavelength than to light having the monitor peak wavelength.

21. The system according to claim 1, wherein the photodetector is one of a photomultiplier tube or an avalanche photodiode.

22. A near-field scanning optical microscope (NSOM) for laser machining a feature on a surface of a microstructure workpiece using a laser source, the NSOM comprising:

the laser source to generate laser light having the laser peak wavelength;

an NSOM probe having a substantially cylindrical shape and including:
- an input plane at one end of the NSOM probe, the laser light generated by the laser source being optically coupled into the NSOM probe through the input plane; and
- a probe tip at another end of the NSOM probe;

optics, including a holey optical fiber, for optically coupling the laser light from the laser source into the NSOM probe through the input plane;

an NSOM mount to controllably hold the NSOM probe and the microstructure workpiece, the NSOM mount including;
- an XY motion stage coupled to one of the NSOM probe or the microstructure workpiece; and
- a Z motion stage coupled to one of the NSOM probe or the microstructure workpiece;

an NSOM probe monitor coupled to the NSOM mount for determining a distance between the probe tip of the NSOM probe and the surface of the microstructure workpiece; and an NSOM controller coupled to the NSOM probe monitor, the XY motion stage, and the Z motion stage, the NSOM controller controlling a vertical position of the one of the NSOM probe or the microstructure workpiece coupled to the Z motion stage based on the distance between the probe tip of the NSOM probe and the surface of the microstructure workpiece determined by the NSOM probe monitor and a horizontal position of the one of the NSOM probe or the microstructure workpiece coupled to the XY motion stage based on the feature to be laser machined on the surface of the microstructure workpiece during laser machining.

23. The system according to claim 22, wherein the input plane of the NSOM probe has an input area approximately equal to a cross-sectional area of a hollow core of the holey optical fiber.

24. A near-field scanning optical microscope (NSOM) for laser machining a feature on a surface of a microstructure workpiece using a laser source, the NSOM comprising:

the laser source to generate laser light having the laser peak wavelength;

an NSOM probe having a substantially cylindrical shape and including:
- an input plane at one end of the NSOM probe, the laser light generated by the laser source being optically coupled into the NSOM probe through the input plane; and
- a probe tip at another end of the NSOM probe;

a coupling substrate formed of a material that is substantially transmissive to the laser peak wavelength, the coupling substrate including top surface with a window portion;

a substrate holder to hold the coupling substrate and the microstructure workpiece;

an NSOM mount to controllably hold the NSOM probe and the substrate holder, the NSOM mount including;
- an XY motion stage coupled to one of the NSOM probe or the substrate holder; and
- a Z motion stage coupled to one of the NSOM probe or the substrate holder;

an NSOM probe monitor coupled to the NSOM mount for determining a distance between the probe tip of the NSOM probe and one of the surface of the microstructure workpiece or the top surface of the coupling substrate;

an NSOM controller coupled to the NSOM probe monitor, the XY motion stage, and the Z motion stage, the NSOM controller controlling one of;
- a vertical position of the one of the NSOM probe or the substrate holder coupled to the Z motion stage based on the distance between the probe tip of the NSOM probe and the top surface of the coupling substrate determined by the NSOM probe monitor such that radiation is coupled from the probe tip of the NSOM probe into the coupling substrate and a horizontal position of the one of the NSOM probe or the substrate holder coupled to the XY motion stage based on a location of the window portion of the top surface of the coupling substrate during NSOM calibration; or the vertical position of the one of the NSOM probe or the substrate holder coupled to the Z motion stage based on the distance between the probe tip of the NSOM probe and the surface of the microstructure workpiece determined by the NSOM probe monitor and the horizontal position of the one of the NSOM probe or the substrate holder coupled to the XY motion stage based on the feature to be laser machined on the surface of the microstructure workpiece during laser machining; and a photodetector optically coupled to the coupling substrate to measure a power of the radiation coupled from the probe tip of the NSOM probe into the coupling substrate during NSOM calibration.

25. The system according to claim 24, wherein the laser peak wavelength of the laser light is less than about 400 nm.

26. The system according to claim 24, wherein the laser source includes an ultrafast laser to generate pulses of the laser light having a predetermined pulse duration less than 1 ns.

27. The system according to claim 24, wherein:

the laser source includes optics for optically coupling the laser light into the NSOM probe through the input plane; and at least one of the optics and a position of the input plane of the NSOM probe are adjusted to substantially optimize the power of the radiation coupled from the probe tip of the NSOM probe into the coupling substrate based on the power of the radiation coupled from the probe tip of the NSOM probe into the coupling substrate measured by the photodetector.

28. The system according to claim 27, wherein:

the optics of the laser source include a solid core optical fiber to transmit the laser light to the NSOM probe; and the input plane of the NSOM probe has an input area approximately equal to a cross-sectional area of the solid core optical fiber.

29. The system according to claim 27, wherein:

the optics of the laser source include a holey optical fiber to transmit the laser light to the NSOM probe; and the input plane of the NSOM probe has an input area approximately equal to a cross-sectional area of a hollow core of the holey optical fiber.

30. The system according to claim 24, wherein a cross-sectional area of the probe tip of the NSOM probe is less than a square of the laser peak wavelength.

31. The system according to claim 24, wherein the NSOM probe further includes:

an optically transmissive core extending substantially from the input plane to the probe tip, the optically transmissive core portion being optically coupled to the laser source through the input plane; and a radiation confinement coating formed on a section of a side surface of the NSOM probe adjacent to the probe tip.

32. The system according to claim 24, wherein a substantially opaque mask layer is formed on the top surface of the coupling substrate, the substantially opaque mask layer including a pinhole exposing the window portion of the top surface of the coupling substrate.

33. The system according to claim 32, wherein the substantially opaque mask layer further includes an orientation mark centered on the pinhole to assist in aligning the probe tip of the NSOM probe with the window portion of the top surface of the coupling substrate.

34. The system according to claim 33, wherein the orientation mark includes one of a plurality of radial lines, a plurality of concentric rings, or a spiral.

35. The system according to claim 24, wherein the substrate holder is adapted to hold the microstructure workpiece and the coupling substrate in a predetermined relationship.

36. The system according to claim 35, wherein the predetermined side-by-side relationship of the microstructure workpiece and the coupling substrate is such that the surface of microstructure workpiece and the top surface of the coupling substrate are substantially parallel.

37. The NSOM according to claim 24, wherein:

the XY motion stage is a piezo-electric XY motion stage; and the Z motion stage is a piezo-electric Z motion stage.

38. The system according to claim 24, wherein:

the NSOM probe monitor includes;

a light source to produce a substantially collimated beam of light having a monitor peak wavelength;

a reflective surface coupled to the NSOM probe to reflect a portion of the substantially collimated beam of light;

an optical detector having at least two detector regions to detect the reflected portion of the substantially collimated beam of light and generate signal based on an amount of light detected by each detector region; and processing means to determine the distance between the probe tip of the NSOM probe and the one of the surface of the microstructure workpiece or the top surface of the coupling substrate based on signals generated by the optical detector; and the material of the coupling substrate is substantially non-transmissive to the monitor peak wavelength.

39. The system according to claim 38, wherein the photodetector is more sensitive to light having the laser peak wavelength than to light having the monitor peak wavelength.

40. The system according to claim 24, wherein the photodetector is one of a photomultiplier tube or an avalanche photodiode.

41. A method for calibrating a near-field scanning optical microscope (NSOM) probe of an NSOM laser machining system, the NSOM laser machining system including a laser source, the NSOM probe, a coupling substrate, and a photodetector, the method comprising the steps of:

a) aligning a probe tip of the NSOM probe over a top surface of the coupling substrate;

b) determining a distance between the probe tip and the top surface of the coupling substrate;

c) controlling the distance between the probe tip and the top surface of the coupling substrate such that the distance is substantially equal to a calibration distance;

d) generating laser light having a predetermined power and a laser peak wavelength using the laser source;

e) coupling the laser light into the NSOM probe of the NSOM laser machining system;

f) coupling a portion of the laser light through the probe tip of the NSOM probe into the coupling substrate;

g) detecting a coupled power of the portion of the laser light coupled into the coupling substrate using the photodetector; and h) adjusting the coupling of the laser light into the NSOM probe in step (e) and repeating steps (f), (g), and (h)

until the coupled power of the portion of the laser light coupled into the coupling substrate in step (f) is substantially optimized.

42. The method according to claim 41, wherein:
the coupling substrate includes a substantially opaque mask layer formed on the top surface, the substantially opaque mask layer including a pinhole exposing a window portion of the top surface of the coupling substrate; and
step (a) includes aligning the probe tip of the NSOM probe over the window portion of the top surface of the coupling substrate.

43. The method according to claim 42, wherein:
the substantially opaque mask layer further includes an orientation mark centered on the pinhole;
step (a) further includes imaging the orientation mark and determining a location of the window portion of the top surface of the coupling substrate relative to the probe tip of the NSOM probe based on the image the orientation mark.

44. The method according to claim 41, wherein step (b) includes detecting an atomic force between the probe tip of the NSOM probe and the top surface of the coupling substrate.

45. The method according to claim 41, wherein:
the NSOM laser machining system further includes a Z motion stage; and
step (c) includes using the Z motion stage to control a vertical position of one of the NSOM probe or the coupling substrate based on the distance between the probe tip of the NSOM probe and the top surface of the coupling substrate determined in step (b).

46. The method according to claim 41, wherein:
the calibration distance is in the range of up to about half of the laser peak wavelength of the laser light; and
the distance between the probe tip of the NSOM probe and the top surface of the coupling substrate is controlled in step (c) with a tolerance of less than 5 nm.

47. The method according to claim 41, wherein:
the laser source of the NSOM laser machining system includes an ultrafast laser;
step (d) includes using the ultrafast laser to generate pulses of laser light having the laser peak wavelength, a predetermined pulse energy, and a predetermined pulse duration; and
the predetermined pulse duration is less than 1 ns.

48. The method according to claim 41, wherein:
the NSOM laser machining system further includes optics;
step (e) includes coupling the laser light from the laser source into the NSOM probe using the optics; and
step (h) includes adjusting the optics to adjust the coupling of the laser light into the NSOM probe in step (e).

49. The method according to claim 41, wherein:
the NSOM probe has a substantially cylindrical shape with the probe tip at one end and further includes an input plane at another end;
step (e) includes coupling the laser light from the laser source into the NSOM probe through the input plane; and
step (h) includes varying a position of the input plane of the NSOM probe to adjust the coupling of the laser light into NSOM probe in step (e).

50. The method according to claim 41, wherein:
the probe tip of the NSOM probe has a tip area less that a square of the peak wavelength; and step (f) includes;
f1) transmitting the portion of the laser light through the probe tip of the NSOM probe; and
f2) coupling the portion of the laser light into the coupling substrate through an irradiated area of the top surface, the irradiated area being substantially equal to the tip area of the probe tip.

51. The method according to claim 41, wherein substantially optimizing the coupled power of the portion of the laser light in step (h) includes at least one of:
maximizing the coupled power of the portion of the laser light coupled into the coupling substrate in step (f); or
setting the coupled power of the portion of the laser light coupled into the coupling substrate in step (f) to a predetermined calibrated power level.

52. A method for laser machining a feature on a microstructure workpiece using a near-field scanning optical microscope (NSOM) laser machining system, the NSOM laser machining system including a laser source, an NSOM probe, a coupling substrate, and a photodetector, the method comprising the steps of:
a) mounting the microstructure workpiece in the NSOM laser machining system;
b) aligning a probe tip of the NSOM probe over a top surface of the coupling substrate;
c) determining a distance between the probe tip and the top surface of the coupling substrate;
d) controlling the distance between the probe tip and the top surface of the coupling substrate such that the distance is substantially equal to a calibration distance;
e) generating laser light having a predetermined calibration power and a laser peak wavelength using the laser source;
f) coupling the laser light into NSOM probe of the NSOM laser machining system;
g) coupling a portion of the laser light through the probe tip of the NSOM probe into the coupling substrate;
h) detecting a coupled power of the portion of the laser light coupled into the coupling substrate using the photodetector;
i) adjusting the coupling of the laser light into NSOM probe in step (f) and repeating steps (g), (h), and (i) until the coupled power of the portion of the laser light coupled into the coupling substrate in step (g) is substantially optimized;
j) realigning the probe tip of an NSOM probe over a machining surface of the microstructure workpiece;
k) adjusting the laser source to generate laser light having a machining power based on the coupled power detected in step (h);
l) determining a distance between the probe tip and the machining surface;
m) controlling the distance between the probe tip and the machining surface such that the distance is substantially equal to a machining distance;
n) coupling the portion of the laser light through the probe tip of the NSOM probe and onto an irradiated area of the machining surface of the microstructure workpiece corresponding to a location of the probe tip to laser machine the irradiated area; and
o) moving at least one of the NSOM probe or the microstructure workpiece such that the probe tip is scanned over a feature region of the machining surface corresponding to the feature while;
repeating steps (l) and (m) to maintain the distance between the probe tip and the machining surface substantially equal to the machining distance; and repeating step (n) to laser machine the feature on the machining surface of the microstructure workpiece.

53. The method according to claim 52, wherein laser machining the irradiated area in step (n) includes at least one of:

ablating workpiece material of the microstructure workpiece in the irradiated area;

laser-assisted chemical vapor depositing deposition material on the machining surface of the microstructure workpiece in the irradiated area;

exposing photoresist on the machining surface of the microstructure workpiece in the irradiated area;

changing an index of refraction of workpiece material of the microstructure workpiece in the irradiated area;

altering a lattice structure of workpiece material of the microstructure workpiece in the irradiated area; or changing a chemical composition of workpiece material of the microstructure workpiece in the irradiated area.

* * * * *